United States Patent
Bowen

[11] 3,913,974
[45] Oct. 21, 1975

[54] CYCLE SEAT

[76] Inventor: Kenneth L. Bowen, 4030 Aragon Drive, San Diego, Calif. 92115

[22] Filed: Sept. 16, 1974

[21] Appl. No.: 506,344

[52] U.S. Cl. ............... 297/195; 280/202; 297/243; 297/377; 297/DIG. 9
[51] Int. Cl.² ............................................ B62J 1/00
[58] Field of Search ...... 297/195, 214, 377, DIG. 9, 297/243, 257, 236, 193, 191; D6/48.1; 280/202

[56] References Cited
UNITED STATES PATENTS

| | | | |
|---|---|---|---|
| 1,102,899 | 7/1914 | Fox | 297/243 X |
| 1,114,801 | 10/1914 | Peterson | 297/236 X |
| 1,216,029 | 2/1917 | Whitaker | 297/243 |
| 3,269,773 | 8/1966 | O'Connor | 297/243 X |
| 3,276,817 | 10/1966 | Marple | 297/377 |
| 3,698,762 | 10/1972 | Gorman | 297/377 |
| 3,779,597 | 12/1973 | Uchida | 297/195 X |
| 3,822,917 | 7/1974 | George | 297/DIG. 9 |
| 3,850,353 | 11/1974 | Foulds | 297/DIG. 9 |
| D216,856 | 3/1970 | Black | D6/48.1 |

*Primary Examiner*—James T. McCall
*Attorney, Agent, or Firm*—Brown & Martin

[57] ABSTRACT

A motorcycle seat for carrying a rider and a rear passenger with the rear passenger having a permanent rear back rest and the front rider having a pivotal back rest. The pivotal back rest pivots upwardly from the rear seat by raising a cushioned portion of the rear seat from a downward position to an upright position.

2 Claims, 4 Drawing Figures

CYCLE SEAT

BACKGROUND OF THE INVENTION

The motorcycle seat for use on certain of the present day modified motorcycles, sometimes referred to as "chopper", have a single seat member for carrying the rider and a rear passenger. These seat members have a low front seat portion for the driver of the motorcycle and a raised rearwardly extending seat for the rear passenger. The low front seat portion cooperates with the feet and legs of the driver being raised and projected fowardly. This position causes the riders upper torso to be naturally inclined rearwardly at an angle. The rear passenger seat is provided with a back rest but the forward seat is not.

When the rider or driver of the motorcycle has a rear passenger, then the rider can lean back against the rear passenger and the rear passenger leans back against the back rest. But where there is no rear passenger, then there is no support for the back of the rider or motorcycle driver. So riding in this position can be tiring.

Thus it is advantageous to provide such a motorcycle seat with an upwardly projecting front back rest portion that can be positioned in the downward position for riding with a rear passenger and that can be pivoted upwardly providing a backrest support for the rider or driver where there is no rear passenger.

SUMMARY OF THE INVENTION

In an exemplary embodiment of the cycle seat of this invention, a rigid seat frame has downwardly projecting means for securing the seat frame to a motorcycle or the like. The seat frame has a front relatively flat portion with an upwardly curved rear portion that curves into a rear seat portion. The front rider rides on the front flat portion and against the first curved portion. A rear rider rides behind the front rider. The rear of the seat frame curves upwardly providing a backrest for the rear rider. Thus in riding on the seat, the rear passenger rests against the backrest and the front rider rests against the rear rider.

The seat frame is cushioned normally by foam rubber with a vinyl covering to provide a padded seat for the rider and passenger and a padded backrest for the passenger. The seat frame is shaped to fit to the front contour of the rear fender and still provide a low seat for the rider, who normally rests his feet on raised front bars that project his legs in a somewhat forward and raised position. This causes the rider's back to lean backwards, and he normally finds back support against the rear passenger. When there is no rear passenger, then there is no support for the back of the front rider or driver. In this invention, a portion of the centered and cushioned part of the rear seat is pivoted upwardly, just back of the upward curved portion of the front seat. This pivoted center portion in the upright and locked position, forms a front backrest for the front seat portion when there is no rear passenger. This pivoted center part has a rigid frame member that is pivotally secured to the seat frame, and pivots forwardly. A pivoting bail support member is pivotally connected to the frame of the pivoted center part, and the free end of the bail co-acts with a suitable notched member secured to the seat frame below the pivoted center part in its lowered position. Thus the front backrest can be positioned to selective angles of inclination.

The front pivoting member of the pivoted center part is connected to an angle member by a hinge that spaces the pivot member a raised distance above the seat frame. Thus when the pivoted center part is pivoted back to the lowered position, then it is held by the hinge above the seat frame providing a space between the frame of the pivoted center part and the seat frame, wherein small tools may be stored.

The rear seat portion has permanently positioned side cushion members that abut the pivoted center part in the lowered position, forming a uniform seat cushion surface when the pivoted center part is in the lowered position. These cushions also form the side of the cavity in which the pivoted center part fits in the lowered position.

It is therefore an object of this invention to provide a new and improved cycle seat for carrying at least a rider and a passenger, which cycle seat has an upwardly pivoting center part that pivots out of the base of the rear passenger seat portion, and forms a front backrest for the rider.

It is another object of this invention to provide a new and improved cycle seat that provides a backrest support for both the front rider and the rear passenger, at selective times.

Other objects and many advantages of this invention will become more apparent upon a reading of the following detailed description and an examination of the drawing wherein like reference numerals designate like parts throughout and in which.

Figure 1:
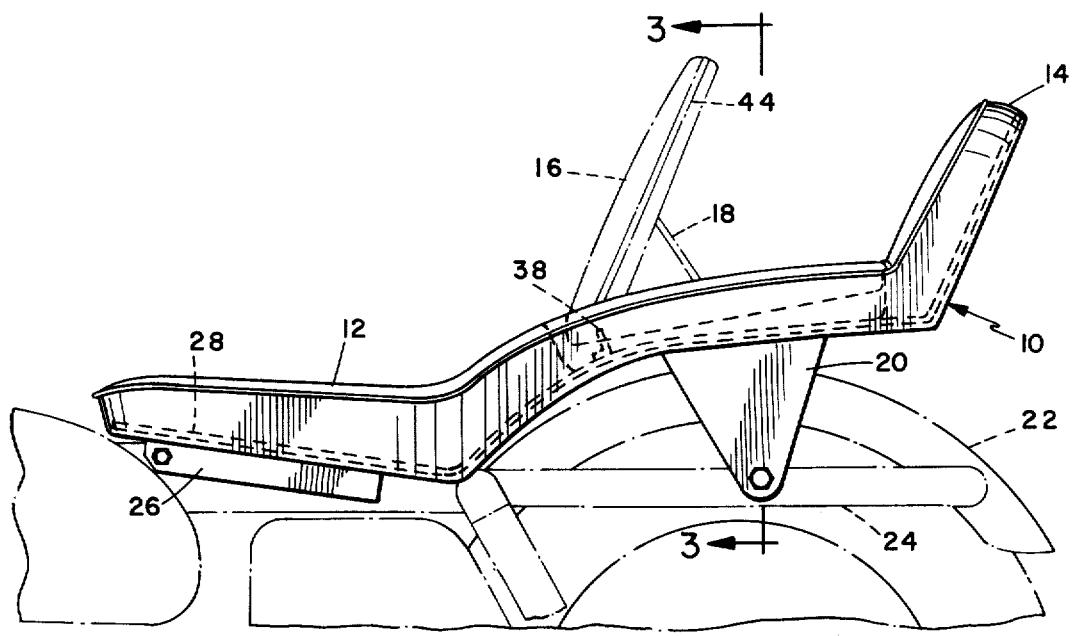
FIG. 1 is a side elevation view of the cycle seat with portions of the motorcycle and internal portions of the cycle seat indicated in broken line.
Figure 2:
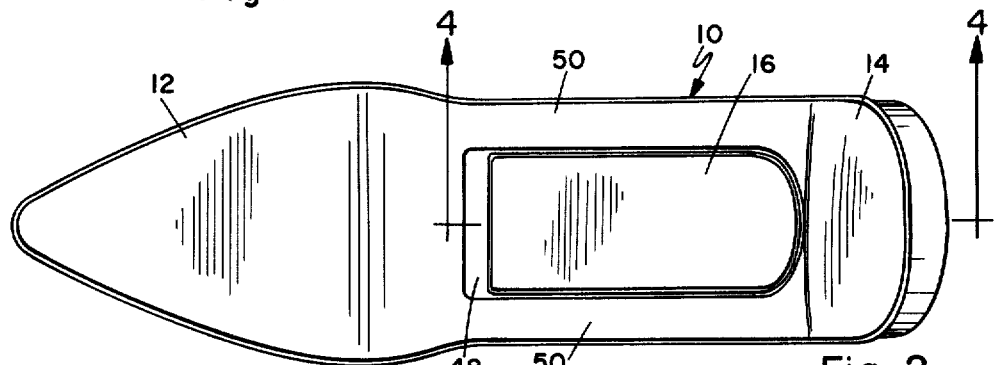
FIG. 2 is a top plan view of the cycle seat of FIG. 1 with the pivotal seat in the lowered position.
Figure 3:
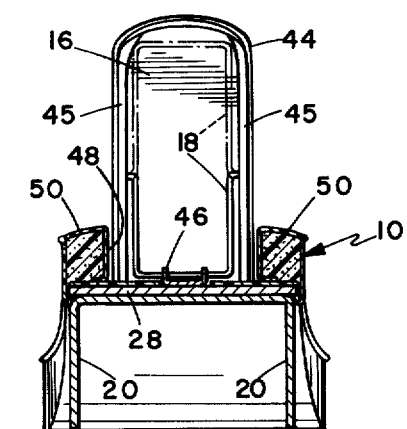
FIG. 3 is a sectional view taken on line 3—3 of FIG. 1 with the front seat backrest in the raised position.

Referring now to the drawing, the cycle seat 10 has a seat frame 28 that extends from the front to the rear of the seat. The seat frame 28 has a relatively flat front portion that integrally connects with a raised curved portion that blends into a substantially flat rear passenger seat portion and then curves upwardly to form a backrest for the rear passenger. This seat frame 28 may be made of steel or other suitable rigid and strong materials. In making the seat, the seat frame 28 is normally covered by any suitable cushion materials such as foam rubber 34, that in turn is covered with a vinyl covering 32 forming a cushioned cover 12 over the seat frame 28.

The seat is secured to a motorcycle by any suitable means, such as by the side, rear, downwardly projecting pair of members 20 that are connected through an opening 30 to a suitable frame member 24 on the motorcycle 22. The forward portion of the seat frame 28 is connected forwardly to a frame portion on the motorcycle by downwardly projecting bar members 26.

Figure 4:
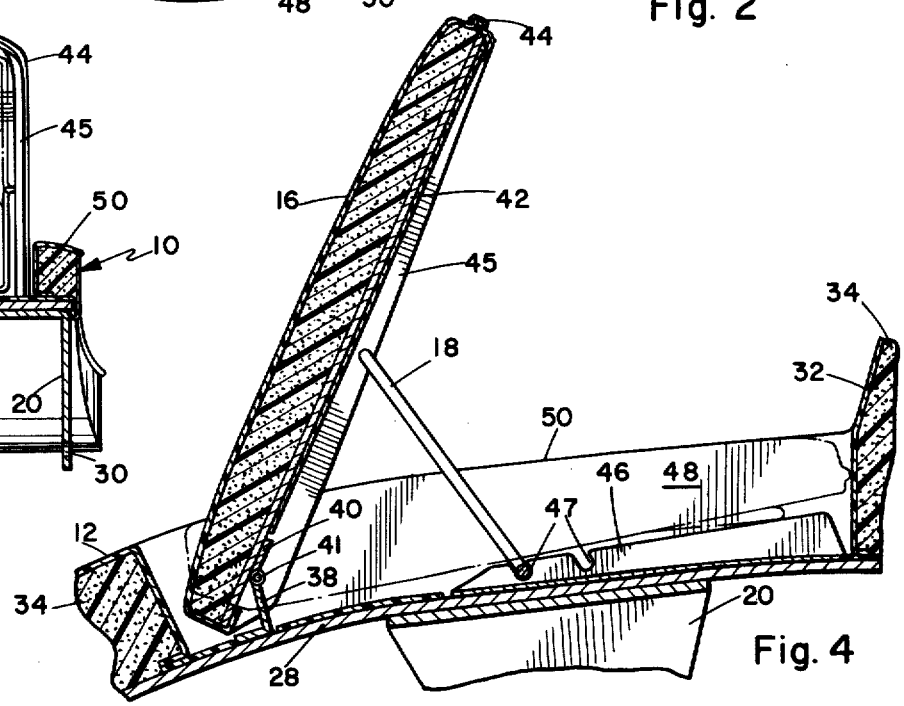
FIG. 4 is an enlarged sectional view taken on line 4—4 of FIG. 2, with the front seat backrest in the raised position.

An opening 48 is made in the area of the rear passenger seat portion and positioned therein is a pivoting center part 16. This center part 16 forms a backrest for the front seat portion when in the raised position as illustrated in FIGS. 1 and 4.

The pivoted seat portion 16 has a rigid frame member 42 that at one end is connected to a plate 40 and through a hinge connection 41 to an angle member 38. The angle member 38 is secured to the upper surface of the seat frame 28. The frame member 42 is covered with the cushion materials, such as foam rubber with a vinyl covering having an outer rib seam 44. The center part frame 42 has downwardly projecting rib members 45 in which are secured, in a pivotal connection, a bail member 18 that provides a pivotal support for the center part 16 in the upright position. A U-shaped plate member 46 is secured to the seat frame 28 and has notches 47 for receiving the end of the bail 18. It may be observed that the two notches provide different angles of upright inclination of the center part 16.

In the lower position, the center part 16 fills in the center space of the opening 48. Side portions 50 of the rear seat portion are permanently adhered to the seat frame and fit against the sides and end of the front seat backrest 16.

In the upright position, the bail 18 sets the angle desired for support of the front rider or driver of the motorcycle. In the down position, a space 48 is provided that may enclose small tools or the like. It may be understood that the thickness of the cushion portion of the pivoted center part 16 may be reduced, and correspondingly the upward length of the angled member 38 increased, to increase the space 48 and thus increase the volume for carrying tools or the like. The seat member may be held in the lowered position by any suitable means.

Having described my invention, I now claim:

1. A cycle seat for motorcycles and the like, comprising:

an elongated seat frame having a front flat portion forming a front seat portion for supporting a front rider, and a rear raised portion for supporting a rear passenger, said rear seat portion being raised to fit over the rear fender of the cycle and having an upwardly extending fixed rear end portion forming a backrest for the rear seat passenger, means for securing said frame to the cycle, a cushioned cover secured on said frame, said rear seat portion having fixed side cushions with a recessed opening therebetween, said rear seat portion having a pivoted center part in said opening with a frame and a corresponding part of the cushioned cover, said center part being pivoted at its forward end to the seat frame to swing upwardly and forwardly to an upright position to form a front backrest for the front seat portion spaced forward of the fixed backrest, and forming a pair of the rear seat portion in a down position in said opening, and support means for supporting said front backrest in the upright position.

2. A cycle seat as claimed in claim 1 wherein, said pivoted center part having a frame member, an angle member secured to said seat frame in said opening and having a raised edge, said center part frame member being pivotally attached to said raised edge, whereby in the down position said seat frame and said center part frame member have a space therebetween for storing tools and the like.

* * * * *